United States Patent
Lee et al.

(10) Patent No.: US 10,761,660 B2
(45) Date of Patent: Sep. 1, 2020

(54) TOUCH DISPLAY DEVICE HAVING TOUCH DISPLAY PANEL CAPABLE OF PREVENTING SHORT CIRCUIT OF ADJACENT TOUGH LINES

(71) Applicant: LG Display Co., Ltd., Seoul (KR)

(72) Inventors: Yangsik Lee, Paju-si (KR); JaeGyun Lee, Paju-si (KR); Hyangmyoung Gwon, Paju-si (KR); DeukSu Lee, Goyang-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/994,828

(22) Filed: May 31, 2018

(65) Prior Publication Data

US 2018/0348913 A1   Dec. 6, 2018

(30) Foreign Application Priority Data

Jun. 1, 2017 (KR) .......................... 10-2017-0068243

(51) Int. Cl.
*G06F 3/041* (2006.01)
*G06F 3/044* (2006.01)

(52) U.S. Cl.
CPC ............ G06F 3/044 (2013.01); G06F 3/0412 (2013.01); G06F 3/0416 (2013.01); *G06F 2203/04103* (2013.01); *G06F 2203/04112* (2013.01)

(58) Field of Classification Search
CPC .......... G06F 2203/04103; G06F 3/044; G06F 3/04164; G06F 3/0414; G06F 3/0412; G06F 3/03; G06F 3/013; G06F 3/011; G06F 3/01; G06F 3/00; G06F 2203/041; G06F 2203/00; G06F 2203/04112; G06F 2203/04102; G06F 3/0416
See application file for complete search history.

(56) References Cited

U.S. PATENT DOCUMENTS

| | | | | |
|---|---|---|---|---|
| 8,786,975 B2* | 7/2014 | Inoue | ................... | G11B 5/3166 360/234.5 |
| 2017/0351379 A1* | 12/2017 | Chen | ................... | H01L 27/1248 |
| 2018/0088726 A1* | 3/2018 | Gwon | ..................... | G06F 3/041 |
| 2019/0131379 A1* | 5/2019 | Won | ..................... | H01L 27/3246 |

* cited by examiner

*Primary Examiner* — Julie Anne Watko
(74) *Attorney, Agent, or Firm* — Polsinelli PC

(57) ABSTRACT

A touch display device includes a touch display panel on which a plurality of touch electrodes is arranged, at least one dam arranged in one direction in an outer edge area of the touch display panel and protruding from a bottom surface on which the dam is arranged, a plurality of touch lines arranged along a shape of the at least one dam in a direction intersecting the at least one dam, and a compensation pattern located in a lower boundary portion of the at least one dam between two adjacent touch lines among the plurality of touch lines.

14 Claims, 15 Drawing Sheets

Encap

TOUCH DISPLAY DEVICE HAVING TOUCH DISPLAY PANEL CAPABLE OF PREVENTING SHORT CIRCUIT OF ADJACENT TOUGH LINES

CROSS-REFERENCE TO RELATED APPLICATION

This application claims the priority of Korean Patent Application No. 10-2017-0068243 filed in the Republic of Korea on Jun. 1, 2017, which is hereby incorporated by reference in its entirety.

BACKGROUND

Field of the Disclosure

The present disclosure relates to a touch display device, a touch display panel, and a method for manufacturing the touch display panel.

Description of the Background

As development of the information-based society, various demands for a display device for displaying images are increasing, and various types of display devices such as a liquid crystal display device, a plasma display device, and an organic light-emitting display device are being utilized.

In order to provide more functions to a user, such display devices provide functions of recognizing a user's touch on a display panel and performing an input process on the basis of the recognized touch.

For example, in order to sense a user's touch on a display panel, a plurality of touch electrodes and touch lines connecting the touch electrodes and a driving circuit to each other are disposed on the display panel. In addition, by sensing a change in capacitance caused by a user's touch on the display panel, the presence or absence of the user's touch on the display panel, a touch position, or the like can be sensed.

At this time, there are problems in that it is difficult to arrange the touch electrodes on the display panel according to the type or structural characteristic of a display device, and in that adjacent touch lines may be short circuited during the process of arranging touch lines due to the limited structure of the display panel.

SUMMARY

Accordingly, the present disclosure is to provide a structure in which touch electrodes and touch lines are disposed on a display panel to be capable of recognizing a user's touch on the display panel.

More specifically, the present disclosure is to provide a touch display device having a structure capable of preventing a short circuit of adjacent touch lines during the process of arranging touch electrodes and touch lines on a display panel, and a manufacturing method thereof.

In one aspect, aspects disclosed herein provide a touch display device including: a touch display panel on which a plurality of touch electrodes is arranged; at least one dam arranged in one direction in an outer edge area of the touch display panel, and having a shape protruding from a bottom surface on which the dam is arranged; a plurality of touch lines arranged along the shape of the dam in a direction intersecting the dam; and a compensation pattern located in a lower boundary portion of the dam in an area between two adjacent touch lines among the plurality of touch lines.

In another aspect, aspects disclosed herein provide a touch display panel including: an encapsulation layer; at least one dam arranged in one direction outside the encapsulation layer, and having a shape protruding from a bottom surface on which the dam is arranged; a plurality of touch lines arranged on the encapsulation layer and the dam and arranged in a direction intersecting the dam; and a compensation pattern located in a lower boundary portion of the dam in an area between two adjacent touch lines among the plurality of touch lines.

In a further aspect, a method of manufacturing a touch display panel includes depositing and etching a first metal layer on an encapsulation layer; depositing a first insulating layer on the first metal layer and forming a compensation pattern in a lower boundary portion of a dam located below the first metal layer; depositing a second metal layer on the first insulating layer; etching the second metal layer and an area where the compensation pattern is formed simultaneously; and depositing and etching a second insulating layer on the second metal layer.

According to aspects disclosed herein, it is possible to provide a touch display device capable of recognizing a user's touch on a display panel through a structure in which touch electrodes and touch lines are arranged in various types of display devices, and a manufacturing method thereof.

According to aspects disclosed herein, it is possible to provide a touch display device and a manufacturing method thereof capable of preventing a short circuit between adjacent touch lines due to a structural characteristic of a display panel in the process of arranging the touch electrodes and the touch lines on the display panel.

BRIEF DESCRIPTION OF THE DRAWINGS

The above and other aspects, features and advantages of the present disclosure will be more apparent from the following detailed description taken in conjunction with the accompanying drawings, in which.

In the drawings.

DETAILED DESCRIPTION

Figure 1:
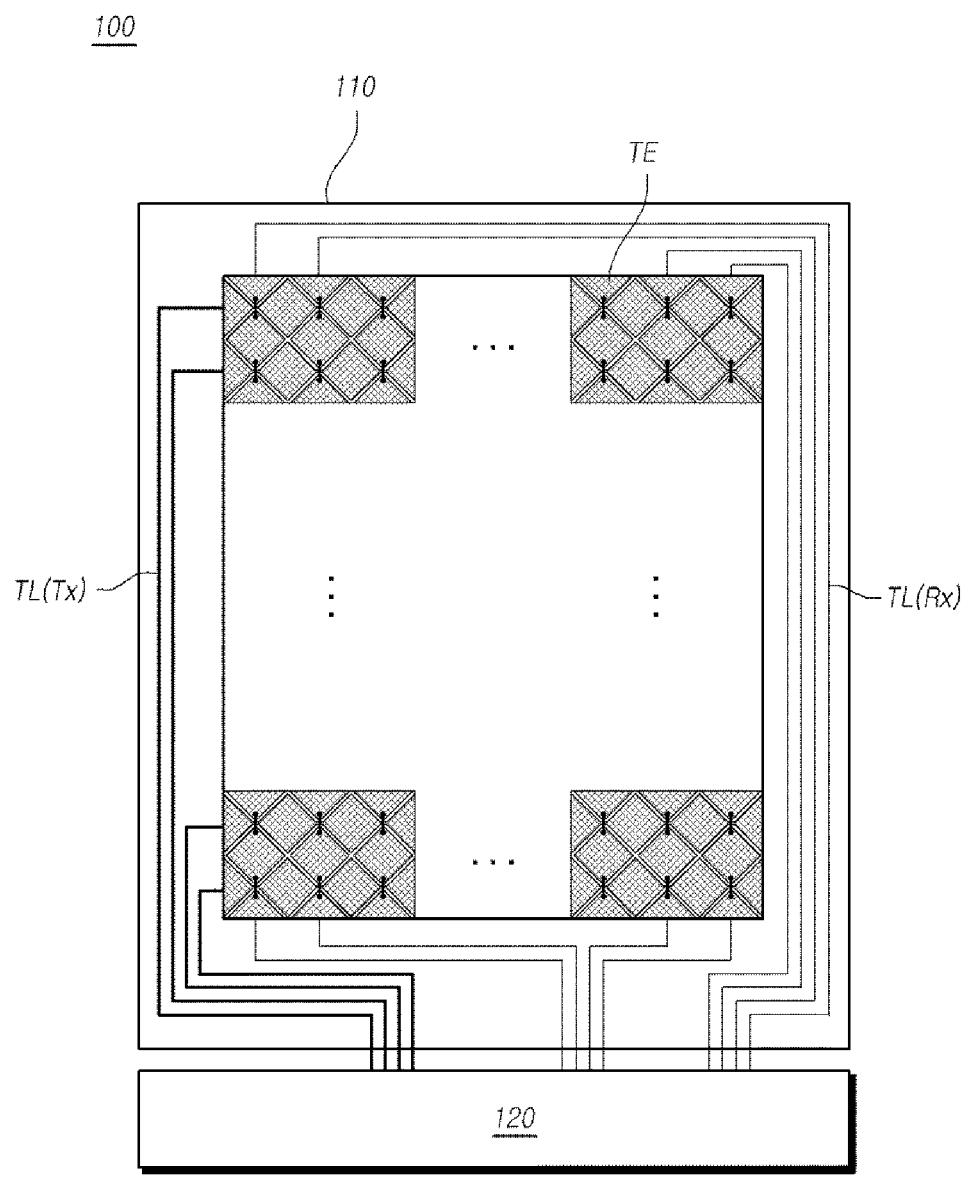
FIG. 1 is a view illustrating a schematic configuration of a touch display device according to aspects of the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a view illustrating a schematic configuration of a touch display device 100 according to aspects of the present disclosure.

Referring to FIG. 1, the touch display device 100 according to the present disclosure includes a touch display panel 110 in which a plurality of touch electrodes TE and a plurality of touch lines TL are disposed, and a driving circuit 120 configured to output a touch driving signal to the touch electrodes TE and to sense a touch on the basis of a touch-sensing signal received from the touch electrodes TE.

The touch display panel 110 may be divided into an active area A/A having a plurality of sub-pixels arranged therein and configured to display an image, and a non-active area N/A located outside the active area A/A and including wires or the like arranged thereon to transmit a signal applied to the sub-pixels.

In the active area A/A of the touch display panel 110, gate lines and data lines are arranged to intersect each other, and the sub-pixels are arranged in an area where the gate lines and the data lines intersect each other.

The subpixels arranged in the active area A/A express gradations according to data voltages supplied through the data lines in accordance with the timing of scan signals applied to the gate lines, so that the images can be displayed through the active area A/A.

In addition to the configuration for driving the display, a plurality of touch electrodes TE for sensing a user's touch may be arranged in the active area A/A.

When the touch display device 100 is a liquid crystal display device, common electrodes arranged in the active area A/A may be used as the plurality of touch electrodes TE. When the touch display device 100 is an organic light-emitting display device, touch electrodes TE may be disposed on an encapsulation layer, but the present disclosure is not limited thereto.

Here, the structure in which touch electrodes TE are arranged in the case where the touch display device 100 is the organic light-emitting display device will be briefly described with reference to FIGS. 2 and 3. The touch electrodes TE may be disposed between the encapsulation layer Encap and a cover of the touch display panel 110.

That is, a configuration for touch sensing such as the touch electrodes TE and the touch lines TL may be disposed on the encapsulation layer Encap.

Specifically, a cathode of an organic light-emitting diode OLED is disposed under the encapsulation layer Encap, and the touch electrodes TE are disposed on the encapsulation layer Encap to be spaced apart from the cathode.

For example, a thickness T of the encapsulation layer Encap may be 5 μm or more.

By designing the thickness T of the encapsulation layer to a predetermined value or more, it is possible to reduce parasitic capacitance formed between the cathode of the OLED and the touch electrodes TE. Thus, it is possible to prevent the touch sensing sensitivity from deteriorating due to the parasitic capacitance.

On the other hand, when the touch electrodes TE are of a mesh type including holes H, the holes H included in the touch electrodes TE may be located to correspond to the light-emitting portions of the sub-pixels.

Therefore, the holes H of the touch electrodes TE may correspond to color filters CF, and when the color filters CF are required, for example, when using a white OLED, it is possible to provide a touch display device 100 having excellent light-emitting performance by making the positions of the color filters CF correspond to the positions of the holes H of the touch electrodes TE.

The vertical positions of the touch electrodes TE and the color filters CF may be variously designed.

Figure 2:
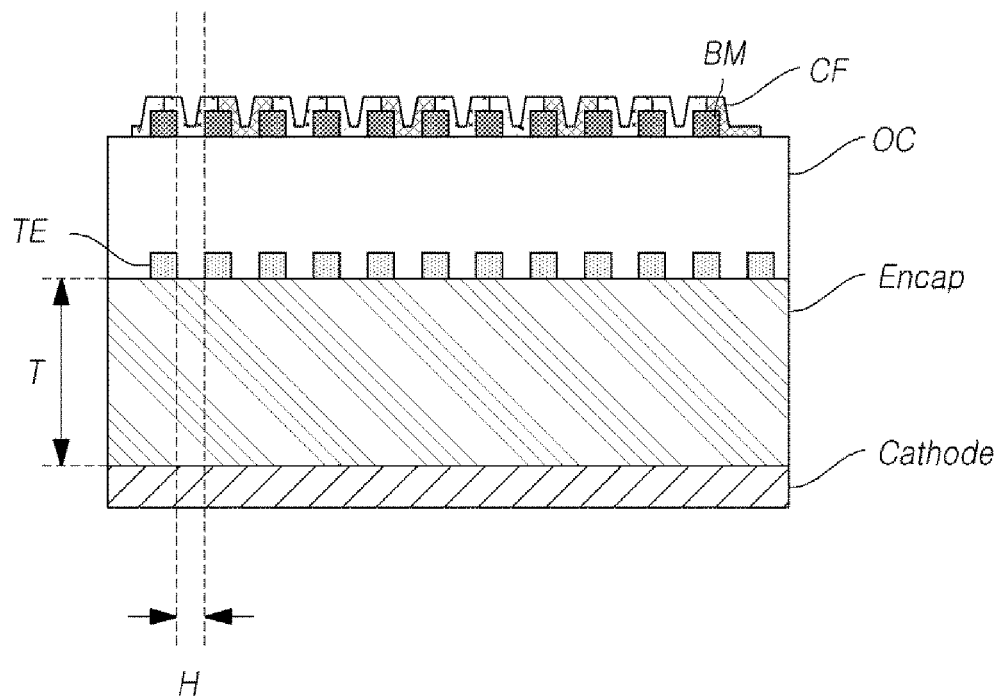
FIGS. 2 and 3 are views illustrating examples of a cross-sectional structure in which touch electrodes and touch lines are disposed in a touch display device according to aspects of the present disclosure.

For example, as illustrated in FIG. 2, the color filters CF and a black matrix BM may be disposed over the touch electrodes TE. In addition, the color filters CF and the black matrix BM may be disposed on an overcoat layer OC, which is disposed on the touch electrodes TE.

Figure 3:
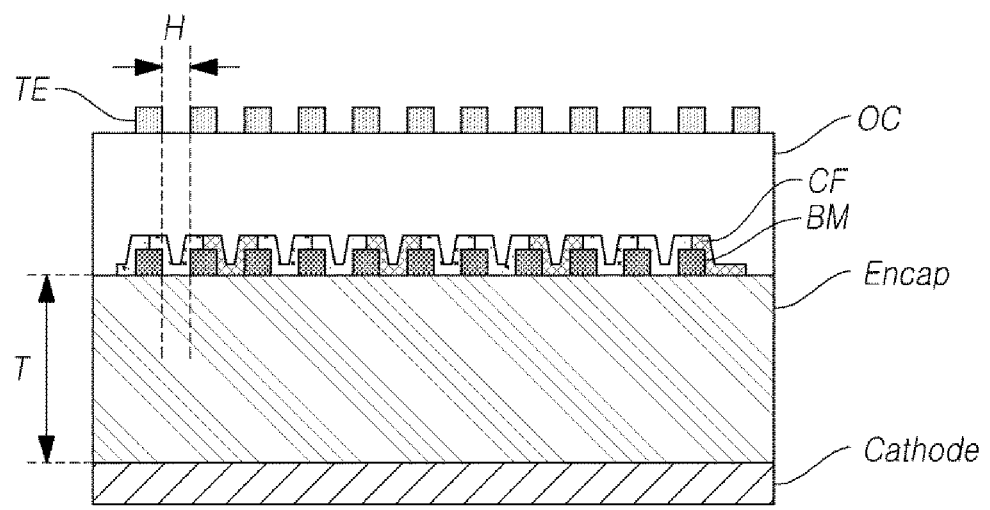

As another example, as illustrated in FIG. 3, the color filters CF and the black matrix BM may be located under the touch electrodes TE. At this time, the touch electrodes TE may be disposed on the overcoat OC, which is disposed on the color filters CF and the black matrix BM.

That is, the touch electrodes TE and the color filter CF may be designed to have an optimal positional relationship in consideration of touch performance and display performance.

In addition, by providing a structure in which the touch electrodes TE are disposed on the encapsulation layer Encap, it is possible to provide an organic light-emitting display device that overcomes a problem that it is difficult to form touch electrodes TE due to an organic material, which are generally made of a metallic material, inside a panel and that has excellent display performance and touch performance.

As described above, the plurality of touch electrodes TE disposed inside the touch display panel 110 is arranged in a structure in which the touch electrodes are uniformly separated from each other in the active area A/A and are electrically connected to the driving circuit 120 through the touch lines TL.

The touch electrodes TE and the touch wirings TL may be arranged in various structures depending on a method of sensing a touch. In the present specification, descriptions are made of a case in which touch sensing is performed by the mutual capacitive sensing method by way of an example, the present aspects are not limited thereto.

The plurality of touch electrodes TE may include Tx electrodes each configured to receive a touch driving signal output from the driving circuit 120 and Rx electrodes each configured to transmit the touch sensing signal to the driving circuit 120.

In addition, the plurality of touch lines TL may include first touch lines TL(Tx) connected to the Tx electrodes among the plurality of touch electrodes TE and second touch lines TL(Rx) connected to the Rx electrodes.

As an example, as illustrated in FIG. 1, the first touch lines TL(Tx) may be connected to the Tx electrodes of the touch electrodes TE in a horizontal direction, and the second touch lines TL(Rx) may be connected to the Rx electrodes of the touch electrodes TE in a vertical direction.

The driving circuit 120 applies a touch driving signal to the Tx electrodes through the first touch lines TL(Tx) during a time period in which the touch is sensed, and receives a touch sensing signal from the Rx electrodes via the second touch sensors TL(Rx), thereby determining presence or absence of the user's touch on the touch display panel 110 and the touch position.

Thus, according to the present aspects, a touch display device 100 is provided in which the touch electrodes TE and the touch lines TL are arranged on a display panel. Through this, the present aspects provide a touch display device capable of recognizing a user's touch on the display panel.

Meanwhile, in the case where the touch display device 100 is an organic light-emitting display device, a dam DAM for preventing the encapsulation layer Encap from collapsing in the non-active area N/A in which the touch lines TL are arranged may be disposed.

Such a dam DAM has a shape protruding from the bottom surface on which the dam is disposed, and may affect the process of arranging the touch lines TL due to the structure of the dam DAM.

Figure 4:
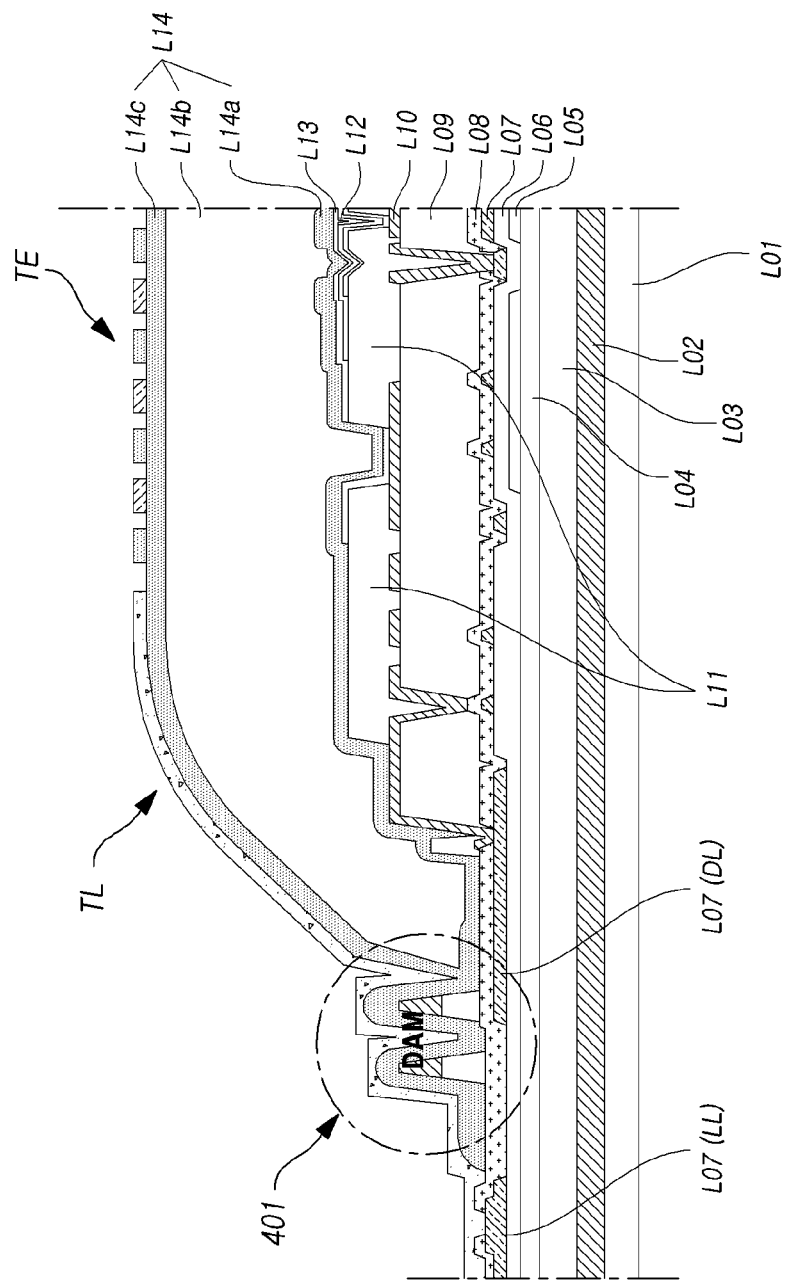
FIG. 4 is a view illustrating an example of a structure in which touch lines are disposed in a portion where a dam is formed in the touch display device according to aspects of the present disclosure.

FIG. 4 illustrates in more detail the structure in which the touch electrodes TE and the touch lines TL are arranged in the case where the touch display device 100 according to the present disclosure is an organic light-emitting display device, in which a cross-sectional structure of a portion where a dam DAM is formed in the touch display panel 110.

Referring to FIG. 4, the touch display panel 110 includes a polyimide layer L02 located on a substrate or a back plate L01.

A buffer layer L03 may be located on the polyimide layer L02, and an interlayer insulating film L04 may be located on the buffer layer L03.

A gate layer L05 may be present on the interlayer insulating film L04, and gate electrodes or the like may be formed in the gate layer L05 at necessary positions.

A gate insulating film L06 may be present on the gate layer L05.

A source/drain layer L07 may be present on the gate insulating film L06.

In the source/drain layer L07, signal lines such as data lines DL and gate lines GL, source/drain electrodes of various transistors, etc. may be formed.

A protective layer L08 may be present on the source/drain layer L07.

A planarization layer L09 may be located on the protective layer L08, and a first electrode layer L10 in which a first electrode is formed at the emission position of each sub-pixel SP, may be present on the planarization layer L09.

A bank layer L11 is located on the first electrode layer L10, and an organic light-emitting layer L12 is located on the bank layer L11.

A second electrode layer L13, which is formed in common to all the sub-pixel regions, may be present on the organic light-emitting layer L12.

On the second electrode layer L13, an encapsulation layer L14 may be present to prevent penetration of moisture, air, or the like.

In addition, in an outer edge of the panel, a dam stacked higher than the periphery may be present in order to prevent the encapsulation layer L14 or the like from collapsing.

The encapsulation layer L14 may be formed by a single layer or may be formed by laminating two or more layers.

Further, the encapsulation layer L14 may be formed of a metallic layer, or may be formed by laminating two or more organic layers and inorganic layers.

FIG. 4 illustrates a case in which the encapsulation layer L14 is implemented by laminating a first encapsulation layer L14a, a second encapsulation layer L14b, and a third encapsulation layer L14c.

Each of the first encapsulation layer L14a, the second encapsulation layer L14b, and the third encapsulation layer L14c may include an organic layer and an inorganic layer.

The touch electrodes TE and the touch lines TL may be disposed on the encapsulation layer L14.

At this time, the touch lines TL may be disposed on the encapsulation layer L14 and the dam, and there is a problem in that a short circuit of adjacent touch lines TL may occur in the process of arranging the touch lines on the dam DAM due to a step in the dam DAM as indicated by a circle 401.

Figure 5:
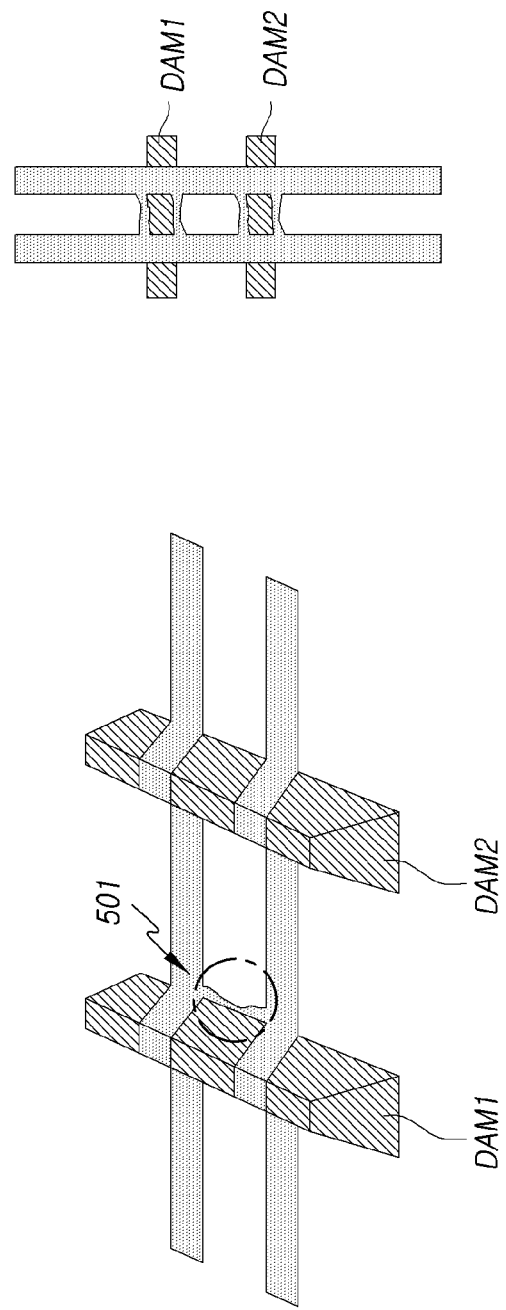
FIG. 5 is a view illustrating an example of an occurrence of a short circuit of touch lines disposed in a portion where a dam is formed in the touch display device according to aspects of the present disclosure.

More specifically, referring to FIG. 5, two dams DAM1 and DAM2 may be disposed in outer edges of the panel, and the touch lines TL are arranged in a direction intersecting the direction in which the dams DAM1 and DAM2 are arranged.

Here, since the touch lines TL are disposed along the shape of the dams DAM1 and DAM 2 each having a step, a residual film can occur at the lower boundaries of the dams DAM1 and DAM2 during the process of arranging the touch lines TL.

When such a residual film occurs, there is a problem in that two adjacent touch lines TL may be short circuited with each other as indicated by 501.

In order to solve the above-described problem, the touch display device 100 according to the present aspects forms a compensation pattern in a portion where the dams DAM1 and DAM2 and the touch lines TL are disposed in the touch display device 100, thereby providing a structure for preventing the short circuit of the touch lines TL.

Figure 6:
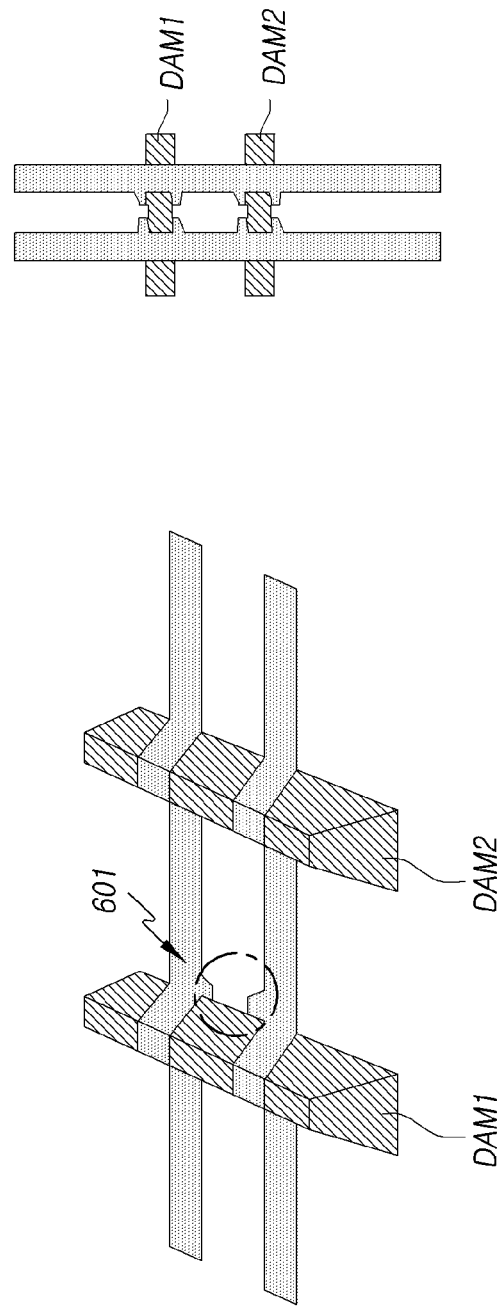
FIG. 6 is a view illustrating an example of a structure of touch lines and a compensation pattern disposed in a portion where a dam is formed in the touch display device according to aspects of the present disclosure.

FIG. 6 illustrates an example of a structure in which a compensation pattern is formed in a portion where the dams DAM1 and DAM2 and the touch lines TL are arranged in the touch display device 100 according to the present disclosure.

Referring to FIG. 6, the dams DAM1 and DAM2 protruding from the bottom surface of the touch display panel 110 may be disposed in the touch display device 100 according to the present disclosure.

The dams DAM may be disposed in a direction parallel to the outer edges of the touch display panel 110 so as to prevent the encapsulation layer from collapsing and two dams DAM1 and DAM2 may be disposed adjacent to each other.

The touch lines TL may be disposed on the encapsulation layer Encap and connected to the touch electrodes TE, and may be disposed in the non-active region N/A of the touch display panel 110 to be connected to the driving circuit 120.

At this time, since the touch lines TL are disposed in the non-active region N/A to connect the touch electrodes TE and the driving circuit 120, the touch lines located in the outer edges of the touch display panel 110 may be arranged in the direction intersecting the dams DAM1 and DAM2.

That is, as illustrated in FIG. 6, the touch lines TL may be arranged in a direction intersecting the dams DAM1 and DAM2, and may be arranged along the shape of the dams DAM1 and DAM2.

Here, since the touch lines TL are arranged along with the shape of the dams DAM1 and DAM2, residual films may be generated at lower boundaries of the dams DAM1 and DAM2 during the process of arranging the touch lines TL due to the steps in the dams DAM1 and DAM2. Thus, in the touch display device 100 according to various aspects, a compensation pattern is formed in the lower boundary of each of the dams DAM1 and DAM2 as indicated by arrow 601.

By forming compensation patterns at the lower boundaries of the dams DAM1 and DAM2, the residual films generated during the process of arranging the touch lines TL can be prevented.

Accordingly, as illustrated in FIG. 6, the residual films protruding from adjacent touch lines TL are separated from each other, so that it is possible to prevent occurrence of such a phenomenon in which a short circuit between the touch lines TL is generated due to the residual films generated in the process of arranging the touch lines TL.

Such a compensation pattern may be formed in the process of forming the touch lines TL on the encapsulation layer Encap.

For example, when the touch lines TL are implemented as a double-layer line structure in which a first metal layer and a second metal layer are laminated, the first metal layer is deposited on the encapsulation layer Encap and is etched so as to form touch lines TL on the first metal layer.

At this time, residual films may be generated in the touch lines TL formed on the dams DAM1 and DAM2 due to the steps in the dams DAM1 and DAM2, and adjacent touch lines TL may be short circuited due to such residual films.

When the etching of the first metal layer is completed, a first insulating layer is deposited and etched on the first metal layer.

Here, a compensation pattern is formed in an area where a residual film of the first metal layer is generated in the first insulating layer, so that the residual film formed on the first metal layer can be exposed.

Then, a second metal layer is deposited on the first insulating layer.

In the process of etching the second metal layer so as to form the touch lines TL, the compensation pattern area formed in the first insulating layer is simultaneously etched.

That is, in the process of etching the second metal layer, the residual film of the first metal layer exposed by the compensation pattern of the first insulating layer is simultaneously etched, so that the short circuit of the touch lines TL due to the residual film of the first metal layer can be prevented.

When the etching of the second metal layer is completed, a second insulating layer is deposited and etched on the second metal layer, thereby completing the processes.

Therefore, by adding the process of forming a compensation pattern in a portion where the dams DAM1 and DAM2 and the touch lines TL intersect each other in the process of forming the touch lines TL on the touch display panel 110, it is possible to prevent a short circuit from occurring between adjacent touch lines TL due to a step in the dams.

Figure 7:
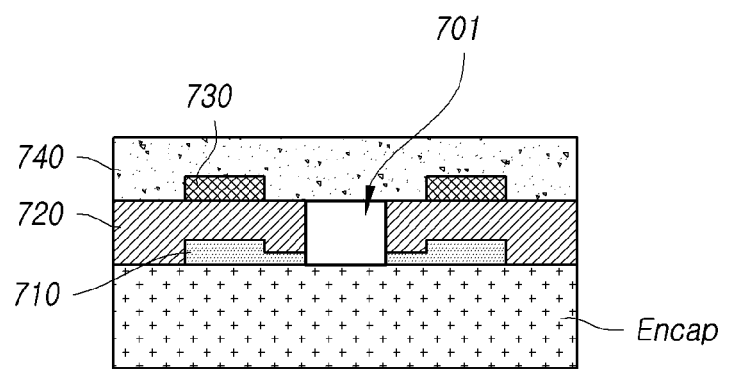
FIG. 7 is a view illustrating an example of a cross-sectional structure of touch lines and a compensation pattern disposed in a portion where a dam is formed in the touch display device according to aspects of the present disclosure.

FIG. 7 illustrates an example of a cross-sectional structure in which a touch line TL is formed in a portion where a dam DAM is formed in the touch display device 100 according to the present disclosure, in which an example of a structure implemented through the processes of the above-mentioned method.

Referring to FIG. 7, a first metal layer 710 is disposed on an encapsulation layer Encap, and a first insulating layer 720 is disposed on the first metal layer 710.

A second metal layer 730 is disposed on the first insulating layer 720, and a second insulating layer 740 is disposed on the second metal layer 730.

The first metal layer 710 and the second metal layer 730 are disposed at positions corresponding to each other, and the metal layers disposed at the corresponding positions constitute the touch lines TL.

As indicated by an arrow 701, a compensation pattern formed in the process of forming the first insulating layer 720 is present in the first insulating layer 720.

The compensation pattern is formed in the process of forming the first insulating layer 720, and the etching of the compensation pattern formed in the first insulating layer 720 is simultaneously performed in the process of depositing and etching the second metal layer 730, so that a residual film formed on the metal layer 710 can be prevented.

In the above-described aspects, descriptions have been made of the case where the touch lines TL are implemented as double-layer lines by way of an example, but the present aspects may also be applied to a case where the touch lines TL are implemented as single-layer lines.

That is, after the processes of depositing and etching the metal layer to form the touch lines TL, a compensation pattern on the insulating layer is formed in the processes of depositing and etching the insulating layer on the metal layer. In addition, through the process of etching the residual film of the metal layer exposed through the compensation pattern area, it is possible to prevent a short circuit of touch lines TL from being caused due to a step in a dam DAM.

In other words, the present disclosure may be applied to all the cases where a step exists in a portion where the touch wireless TL are arranged during the process of forming the touch wires TL.

Hereinafter, the process of forming the cross-sectional structure illustrated in FIG. 7 will be described in detail with reference to FIGS. 8A to 8G.

FIGS. 8A to 8G illustrate an example of a process of arranging the touch wires TL in a portion where dams DAM and touch lines TL intersect each other in the touch display device 100 according to the present disclosure.

Figure 8A:
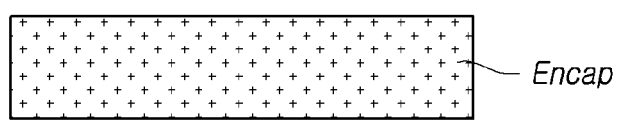
FIGS. 8A to 8G are views illustrating an example of a process depositing and etching touch lines and a compensation pattern in a portion where a dam is formed in the touch display device according to aspects of the present disclosure.
Figure 8B:
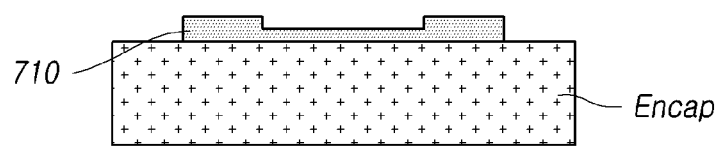

In the state in which the encapsulation layer Encap is disposed as illustrated in FIG. 8A, the first metal layer 710 is deposited on the encapsulation layer Encap as in FIG. 8B.

By performing the processes of depositing the first metal layer 710 and of etching the first metal layer 710, the first metal layer 710 is caused to form the shape of the touch lines TL.

Here, when the touch lines TL formed in the first metal layer 710 are arranged on a stepped dam DAM to intersect the dam DAM, a residual film may be formed at a lower boundary of the dam DAM.

This residual film may cause a short circuit between adjacent touch wirings TL formed in the first metal layer 710.

Figure 8C:
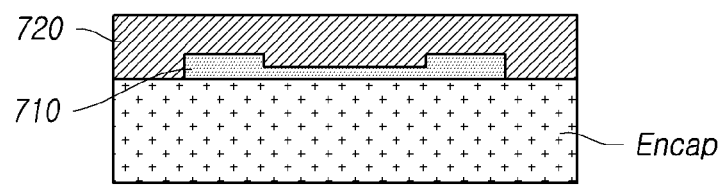
Figure 8D:
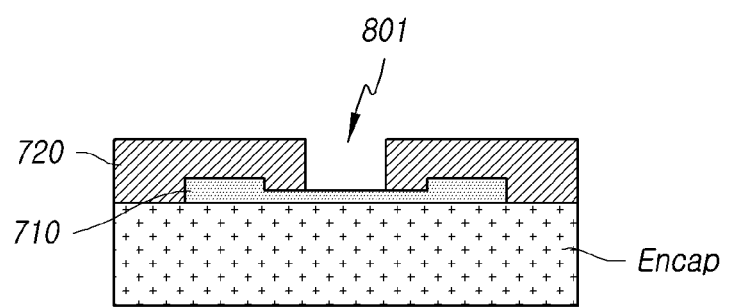

In the present aspects, in order to prevent occurrence of a phenomenon in which the touch lines TL are short circuited due to such a residual film, a first insulating layer 720 is deposited on the first metal layer 710 as illustrated in FIG. 8C, and a compensation pattern is formed on the first insulating layer 720 as illustrated in FIG. 8D.

That is, as indicated by an arrow 801, a compensation pattern is formed on the first insulating layer 720 corresponding to a lower boundary portion of a dam DAM where short-circuiting of adjacent touch lines TL occurs in the first metal layer 710 such that a short circuited portion of the first metal layer 710 is exposed.

Figure 8E:
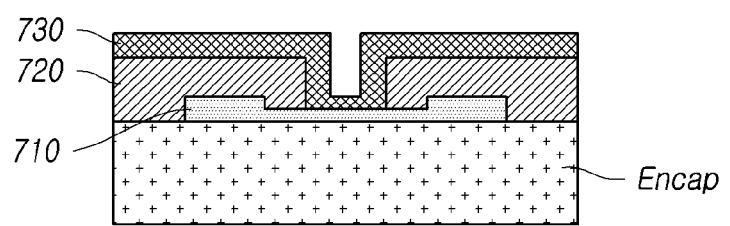

After the compensation pattern is formed on the first insulating layer 720, a second metal layer 730 is deposited on the first insulating layer 720 as illustrated in FIG. 8E.

Since the compensation pattern is formed on the first insulating layer 720 when depositing the second metal layer 730, the second metal layer 730 is deposited on the area where the compensation pattern is formed.

Then, in the process of etching the second metal layer 730 in order to form the touch lines TL on the second metal layer 730, the etching process for the compensation pattern area is performed simultaneously.

Figure 8F:
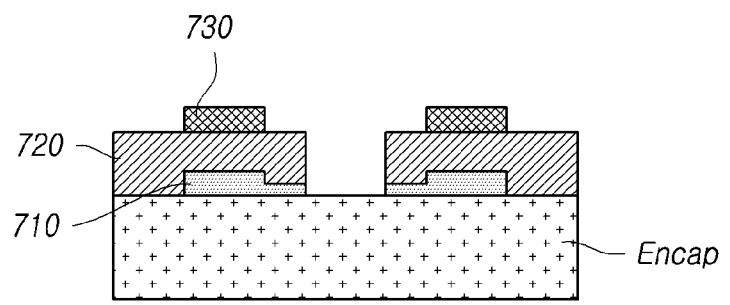

Since the compensation pattern area is simultaneously etched in the process of etching the second metal layer 730, as illustrated in FIG. 8F, a residual film formed on the first metal layer 710 corresponding to the compensation pattern area is etched together with the second metal layer 730.

Figure 8G:
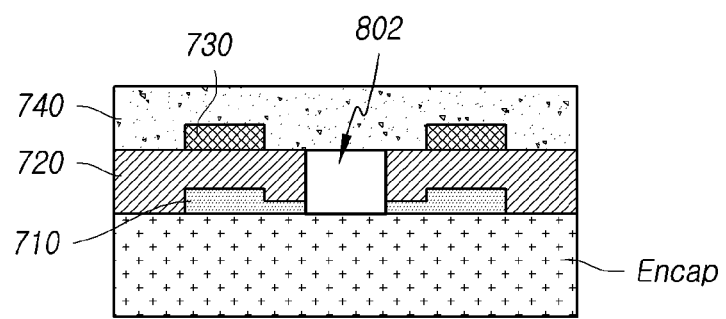

After the process of simultaneously etching the compensation pattern areas of the second metal layer 730 and the first insulating layer 720, the processes of depositing and etching a second insulating layer 740 on the second metal layer 730 are completed as illustrated in FIG. 8G, and a compensation pattern is formed in the area corresponding to the residual film area of the first metal layer 710 on the first insulating layer 720 as indicated by an arrow 802.

Therefore, according to the present disclosure, by performing the processes of forming a compensation pattern in an area where a residual film of the touch lines TL is generated due to a step in a dam DAM and of removing the residual film in the process of forming the touch lines TL, it is possible to prevent a short circuit between adjacent touch lines TL.

Figure 9:
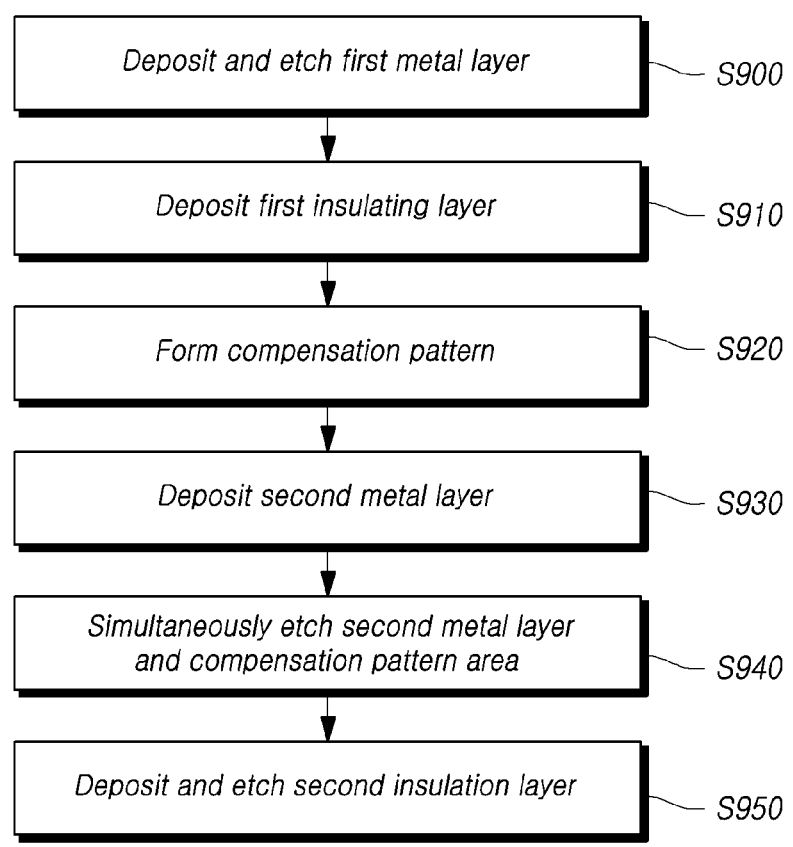
FIG. 9 is a view illustrating a process of a method of manufacturing a touch display device according to aspects of the present disclosure.

FIG. 9 illustrates a process of a method of manufacturing a touch display panel 110 according to the present disclosure.

Referring to FIG. 9, a first metal layer is deposited and etched on an encapsulation layer (S900), and a first insulating layer is deposited on the first metal layer (S910).

A compensation pattern is formed in an area corresponding to an area where the residual film of the first metal layer is formed on the first insulating layer (S920).

After the compensation pattern is formed, a second metal layer is deposited on the first insulating layer (S930). Then, the process of etching the second metal layer is performed, and at this time, the compensation pattern areas of the second metal layer and the first insulating layer are simultaneously etched (S940).

After the etching on the second metal layer is completed, a second insulating layer is deposited and etched on the second metal layer, thereby completing the processes (S950).

According to the present disclosure, in arranging the touch lines TL on the touch display panel 110, a compensation pattern is formed in a portion where a stepped structure such as a dam DAM intersects the touch lines TL, so that a residual film of the touch lines TL caused by a step can be prevented.

Through this, it is possible to prevent a short circuit between adjacent touch lines TL, and, by preventing a short circuit of the touch lines TL that may occur during the process, it is possible to provide a touch display panel 110 that is capable of reducing the defective rate and recognizing a touch.

Although the aspects of the present disclosure have been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A touch display device comprising:
   a touch display panel on which a plurality of touch electrodes is arranged;
   at least one dam arranged in one direction in an outer edge area of the touch display panel and protruding from a bottom surface on which the dam is arranged;
   a plurality of touch lines arranged along a shape of the at least one dam in a direction intersecting the at least one dam; and
   a compensation pattern located in a lower boundary portion of the at least one dam between two adjacent touch lines among the plurality of touch lines; and
   an insulation layer covering the two adjacent touch lines, wherein the compensation pattern includes a hole located in the insulation layer and separates the two adjacent touch lines from each other.

2. The touch display device of claim 1, wherein the plurality of touch lines has a residual film extended to a portion where the touch lines meet the lower boundary portion of the at least one dam.

3. The touch display device of claim 2, wherein the two adjacent touch lines include a first touch line and a second touch line.

4. The touch display device of claim 3, wherein the residual film includes a first residual film extended from the first touch line toward the second touch line and a second residual film extended from the second touch line toward the first touch line, and the first and second residual films are separated from each other.

5. The touch display device of claim 1, wherein the plurality of touch lines includes first and second metal layers, and the second metal layer is located above the first metal layer and arranged at a position corresponding to the first metal layer.

6. The touch display device of claim 5, wherein the compensation pattern located in the insulation layer is disposed between the first metal layer and the second metal layer.

7. The touch display device of claim 1, wherein the compensation pattern located in the insulation layer is disposed between the two adjacent touch lines.

8. A touch display panel comprising:
   an encapsulation layer;
   at least one dam extended from the encapsulation layer, disposed in a non-active area of a display panel and preventing the encapsulation layer from collapsing a plurality of touch lines disposed on the encapsulation layer and intersecting the at least one dam;

a compensation pattern located in a lower boundary portion of the at least one dam between two adjacent touch lines among the plurality of touch lines; and an insulation layer covering the two adjacent touch lines, wherein the compensation pattern includes a hole disposed in the insulation layer and separates the two adjacent touch lines from each other.

9. The touch display panel of claim 8, wherein the plurality of touch lines has a residual film extended to a portion where the touch lines meet the lower boundary portion of the at least one dam.

10. The touch display panel of claim 9, wherein the two adjacent touch lines include a first touch line and a second touch line adjacent to the first touch line.

11. The touch display panel of claim 10, wherein the residual film includes a first residual film extended from the first touch line toward the second touch line and a second residual film protruding from the second touch line toward the first touch line, and the first and second residual films are separated from each other.

12. The touch display panel of claim 8, wherein the plurality of touch lines includes first and second metal layers, and the second metal layer is located above the first metal layer and arranged at a position corresponding to the first metal layer.

13. The touch display panel of claim 12, wherein the compensation pattern located in the insulation layer is disposed between the first metal layer and the second metal layer.

14. The touch display panel of claim 8, wherein the compensation pattern located in the insulation layer is disposed between the two adjacent touch lines.

* * * * *